Philip Martin Thompson
George Brian Barrie Chaplin
Inventors
By William E. P. Bayly
their attorney Philip Martin Thompson
George Brian Barrie Chaplin
Inventors
By: William E. P. Bayly
their attorney.

Philip Martin Thompson
George Brian Barrie Chaplin
Inventors
By: William E.P. Bayly
their attorney.

Philip Martin Thompson
George Brian Barrie Chaplin
Inventors
By: William E. P. Begly
their attorney.

Philip Martin Thompson
George Brian Barrie Chaplin
Inventors
By: William E. P. Bayly
their attorney.

United States Patent Office 3,122,657

Patented Feb. 25, 1964

3,122,657

TUNNEL DIODE CIRCUITS

Philip Martin Thompson, Romsey, and George Brian Barrie Chaplin, Southampton, England, assignors to The Plessey Company Limited Filed Jan. 23, 1962, Ser. No. 168,281
11 Claims. (Cl. 307—88.5)

Figure 1:
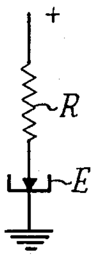
Figure 2:
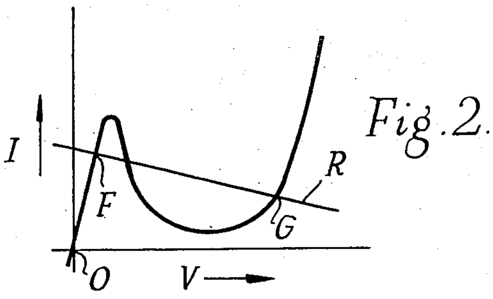

Since the introduction of the tunnel diode there have been several attempts to apply it to computer logic and memory circuits. The tunnel diode has been used mainly in two circuit forms as a bistable element. One is illustrated in FIGURE 1, while FIGURE 2 shows its characteristic. A tunnel diode E is connected, in series with a resistor R, across a constant voltage $V_0$ applied with the polarity indicated by the + sign. As shown in FIGURE 2, the load line of the resistor R intersects the tunnel diode characteristic at three points, two of which (F and G) are stable. The other bistable element is the "Goto pair" illustrated in FIGURE 3. The tunnel diodes $E_1$ and $E_2$ are connected in series across a fixed voltage which is chosen to maintain one in the higher voltage state and the other in the lower, so that if $E_1$ is set in the high voltage state then $E_2$ must be in the low voltage state and vice versa. This voltage is approximately 0.5 v. for germanium.

These bistable circuits have been coupled with linear elements, i.e. resistors, capacitors, inductors, and transformers, and several systems of computer logic and memory based on these arrangements have been proposed. In all these systems, linear elements have hitherto been used for coupling. The coupling between the circuits of these known systems was therefore bilateral, so that other methods have had to be employed to determine the directions of propagation of a signal through a series of stages. While in transistor and valve circuits this problem has been solved by the use of non-linear elements, such as rectifier diodes, in the coupling circuits, in tunnel diode bistable circuits as hitherto known the available voltage swing is too low compared with the voltage required for forward conduction of the rectifier diode, to permit the analogous application of this solution.

The present invention has for an object to provide an improved logic rectifier diode coupling, in which this difficulty is overcome. According to one aspect of the invention two tunnel diodes at least one of which is individually so biased by a current of such direction and magnitude as to allow the diode to be in either of its two stable states, are coupled by a rectifier diode which is normally non-conductive, and means are provided for applying to the rectifier a voltage of such direction and magnitude as will render it conductive to change the state of one of the tunnel diodes when and only when the other tunnel diode is in a predetermined one of its two stable states.

According to another aspect of the invention in a circuit comprising two tunnel diodes connected in series with the interposition of a rectifier diode, all three diodes being connected in the same (polar) direction, each tunnel diode is biased by a current supplied at its connection to the rectifier diode and of such magnitude and direction as to permit the tunnel diode to be in either of its two stable states, the current in one of the tunnel diodes being nearer to the current maximum of the diode than is the current in the other tunnel diode, and a bias voltage of such magnitude and direction is applied to the three series-connected diodes that the rectifier diode is non-conductive whichever is the state of each of the tunnel diodes, means being provided for applying to the three series-connected diodes voltage pulses of the polarity which tends to render the rectifier diode conductive and of such magnitude as will render the rectifier diode conductive and force one of the tunnel diodes to its high-voltage state when and only when both tunnel-diodes are in their low-voltage states.

Figures 3, 4:
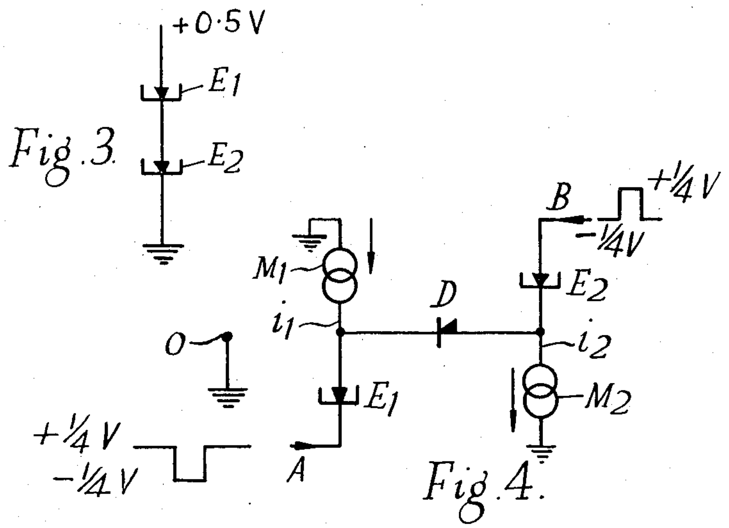

A basic circuit of an embodiment of the last-mentioned aspect is shown in FIGURE 4. Opposite poles of two tunnel diodes $E_1$ and $E_2$ are interconnected with the interposition of a rectifier diode D, and constant unidirectional currents $i_1$ and $i_2$ are respectively passed by current generators $M_1$ and $M_2$ through each of the two tunnel diodes. The arrangement is equivalent to two circuits of the type shown in FIGURE 1 when A and B are both at the same potential (normal state), and equivalent, to some extent, to a Goto pair, when B is made approximately 0.5 v. positive of A (pulsed-state) assuming that D is a germanium rectifier. Both currents $i_1$ and $i_2$ are so chosen as to permit the respective tunnel diode to be in either of its two stable states, but the current $i_2$ is arranged to be nearer the current maximum of diode $E_2$ than the current $i_1$ is to the current maximum of diode $E_1$.

Figure 5:
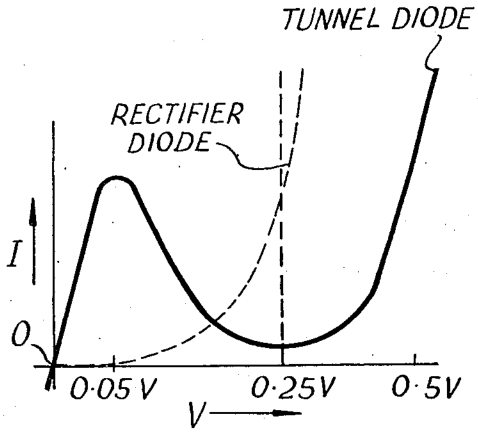

FIGURE 5 shows the relative shapes of the forward conduction curves of germanium rectifiers and germanium tunnel diodes. It will be seen that on the one hand, when two tunnel diodes of this kind are series-connected and a total voltage of plus 0.5 volt is applied to the series-connected diodes in their forward direction, it is impossible for both diodes to be in their low-voltage states, the maximum voltage at which the low-voltage sttae of the tunnel diode can exist, being approximately 0.05 volt, and also impossible for both diodes to be in their high-voltage states, which would require a minimum voltage of nearly 0.5 volt across each of the tunnel diodes, and that furthermore the rectifier diode D only becomes conductive when not less than a voltage somewhat below 0.25 volt is applied to it in the forward direction.

Now if, in the arrangement of FIG. 4, the negative pole A of tunnel diode $E_1$ is made 0.25 volt positive to earth, and the positive pole B of tunnel diode $E_2$ is made 0.25 volt negative to earth, it will be evident that no transfer of states from tunnel diode $E_1$ to tunnel diode $E_2$ or vice versa can be effected because the rectifier D will remain non-conductive irrespective of the states in which the two tunnel diodes $E_1$ and $E_2$ have been stabilised. If however a pulse is applied simultaneously to each of electrodes A and B to render these respectively 0.25 volt negative and 0.25 volt positive to earth, there is a voltage difference of 0.5 volt between points B and A; if both tunnel diodes $E_1$ and $E_2$ are in the low-voltage state, a current will flow through the rectifier D which will raise the current flow in each tunnel diode, and since it has been assumed that the basic current $i_2$ of tunnel $E_2$ is nearer to the maximum low-state current of that tunnel diode than is the current $i_1$ to the maximum low-state current of diode $E_1$, it will be apparent that when the current through rectifier D reaches a predetermined value, tunnel diode $E_2$ will change over from its low-voltage state to its high-voltage state, while the current is not yet sufficient to change the state of tunnel diode $E_1$. The moment this change of tunnel diode $E_2$ occurs, the voltage drop across tunnel diode $E_2$ will reach a value close to 0.5 volt, i.e. close to the total potential difference applied between points A and B, thus reducing the voltage available at the tunnel diode $E_1$ considerably below the minimum at which the high-voltage state can be maintained, thereby ensuring that tunnel diode $E_1$ remains in its low-voltage state. Moreover, the voltage difference between the junction of tunnel diode $E_2$ with rectifier D and point A will now be insufficient to render rectifier D conductive, so that tunnel diode $E_1$ becomes isolated again from tunnel diode $E_2$. If on the other hand at the beginning of the operation tunnel diode $E_1$ is at its high-voltage state, and the same voltage pulses are applied to points A and B, the greater part of the potential difference of 0.5 volt set up in the previously-defined direction between these two points will be consumed by the voltage drop across tunnel diode $E_1$ in its high-voltage state, thus giving insufficient voltage difference between point B and the junction of rectifier D with the tunnel diode $E_1$ to render the rectifier diode conductive. It will thus be evident that the current flow through tunnel diode $E_2$ will not be materially increased, and tunnel diode $E_2$ will remain in its low-voltage state. It will also be observed that when a pulse is applied in the manner described with the current conditions as described, tunnel diode $E_2$, when originally in the low-voltage state, will be set to a state opposite to that to which diode $E_1$ has been previously set, but there is no risk of conversely tunnel diode $E_1$ being set to a state determined by the condition in which tunnel diode $E_2$ is at the beginning of the operation. The operation can however be reversed at will if the relationship of the currents $i_1$ and $i_2$ is reversed. As will appear further below, this fact can be used with advantage in certain circuits.

Figures 6, 7, 8:
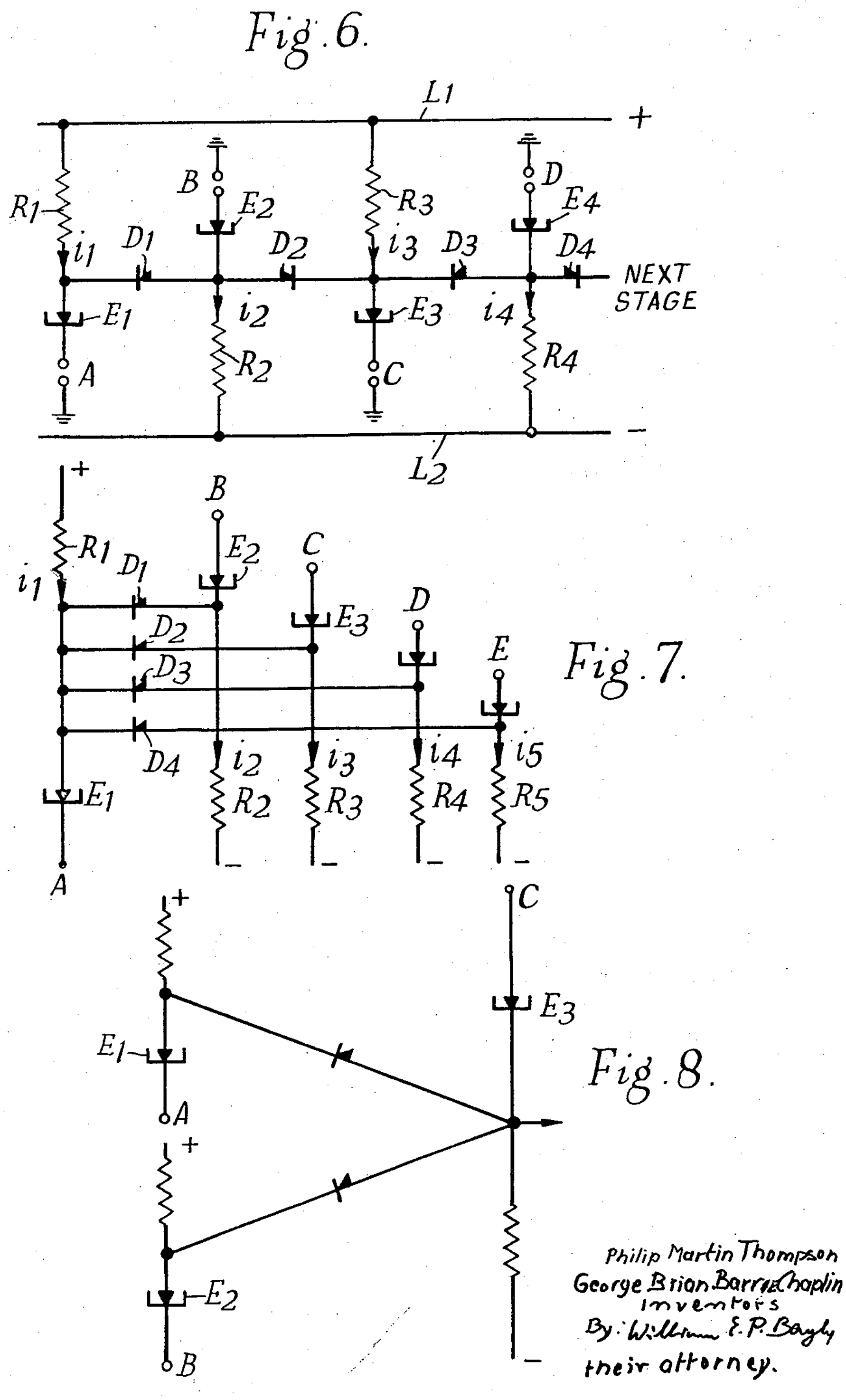

FIGURE 6, which illustrates one form of such circuit, shows an arrangement by means of which states of a tunnel diode may be transferred along a chain from one tunnel diode to another. In this embodiment the currents $i_1$ and $i_2$ etc., are shown as produced by the application of a suitable voltage to a resistor $R_1$, $R_2$ etc., connected in series with the tunnel diode in question. Consecutive tunnel diodes of the chain are respectively connected to earth with their negative and positive terminal, the free terminals of all resistors connected to the positive terminals of the odd-numbered tunnel diodes being connected to a common line $L_1$, and the free ends of the terminals of the even-numbered resistors being connected to a negative common line $L_2$; furthermore all rectifiers are arranged in the such direction, as to oppose the flow of bias current between lines $L_1$ and $L_2$ through each rectifier.

The (reversed) transfer of the state of tunnel diode $E_1$ to tunnel diode $E_2$ will accordingly be effected exactly in the manner described with reference to FIGURE 4. During the above-mentioned step of transferring the state of $E_1$ to $E_2$, the negative voltage at common line $-L_2$ is chosen slightly higher than the positive voltage at common line $L_1$, thus ensuring that the state of $E_1$ is transferred to $E_2$ and not the reverse. During the next application of pulses, when it is desired to transfer the state of $E_2$ to $E_3$, the positive voltage applied to $L_1$ is made greater than the negative voltage applied to $L_2$, thus ensuring that when both tunnel diodes $E_2$ and $E_3$ are in the low-voltage state, it will be tunnel diode $E_3$ and not tunnel diode $E_2$ which will change the state on the application of a pulse to points B and C. It will be appreciated that while in the simple arrangement of FIGURE 4 it might have been sufficient to apply the pulses to A and B, or to either of these, starting from zero level, the feature of starting from $-0.25$ volt at A, C etc., and $+0.25$ volt at B, D etc., in conjunction with the distribution of the 0.5 volt pulse between the two points A and B or B and C, will ensure that during the pulse intended for a transfer of the state of $E_2$ to $E_3$, rectifiers $D_1$ and $D_3$ remain non-conductive and only rectifier $D_2$ will become conductive, thus ensuring that transfer from $E_2$ will take place only to $E_3$ and not in the reverse direction from $E_2$ to $E_1$. All tunnel diodes may be reset to their low-voltage state by temporarily removing the biasing voltages from lines $L_1$ and $L_2$.

Unlike tunnel diode circuits which use linear coupling elements, the circuits according to the invention are capable of large "fan-out" numbers, i.e. it is possible for one circuit to drive several other circuits, as shown in FIGURE 7. $E_1$ may set its opposite state into $E_2$, $E_3$, $E_4$ and $E_5$ if the pulses are applied to B, C, D, and E at different times.

An "or" gate can be constructed as shown in FIGURE 8, which is drawn as a two-input "or" gate, and large "fan-in" numbers are similarly feasible, no special timing arrangements being required in contrast to the "fan-out" technique described with reference to FIGURE 7. Tunnel diode $E_3$ will be raised from its low-voltage state to its high-voltage state if either or both of $E_1$ and $E_2$ are in the low-voltage state, but if both $E_1$ and $E_2$ are in the high-voltage state, $E_3$ will remain in the low-voltage state.

Figure 9:
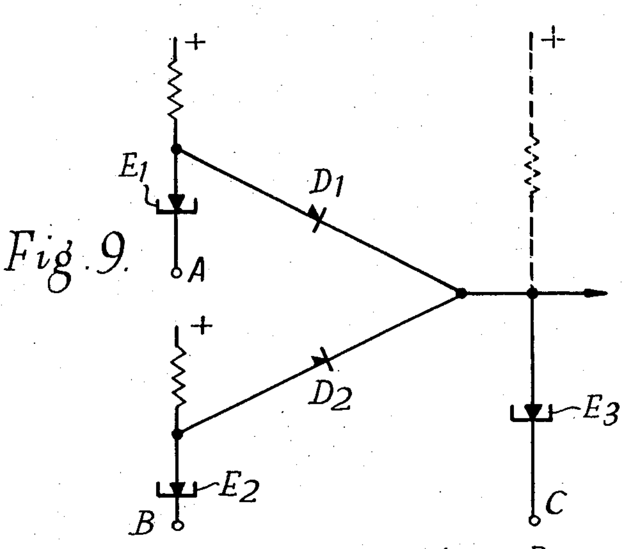

FIGURE 9 shows an "and" gate, incorporating the first aspect, at least, of the present invention. If, and only if, both input tunnel diodes $E_1$ and $E_2$ are in the low-voltage state, $E_3$ will remain in the low voltage state. This gate will work with the free terminals of all three tunnel diodes earthed or similarly interconnected, and without requiring the application of external pulses. In other words $E_3$ will remain in its low-voltage state as long as both $E_1$ and $E_2$ remain in the low-voltage state. When and as soon as either $E_1$ or $E_2$ (or each) changes to its high-voltage state, the resulting voltage drop of nearly 0.5 v. across it will render the associated rectifier $D_1$ or $D_2$ conductive, thus placing $E_3$ in parallel with the tunnel diode $E_1$ or $E_2$ which is in its high-voltage state, and thereby raising $E_3$ to its high-voltage state.

As soon as both $E_1$ and $E_2$ are again in their low-voltage state, rectifiers $D_1$ and $D_2$ become again non-conductive, thus allowing tunnel diode $E_3$ to return to its low-voltage state. If desired $E_3$ may, as indicated in broken lines, have a bias current applied to it similarly to $E_1$ and $E_2$. In this case it will, once it has been changed to its high-voltage state, remain in its high-voltage state until it is re-set by removal of its bias current.

It will be appreciated that, alternatively, the circuit of FIGURE 8 may be considered to be an "and" gate, because $E_3$ will remain in its low-voltage state only when both $E_1$ and $E_2$ are in the high-voltage state, and similarly the circuit of FIGURE 9 may be considered to be an "or" gate.

Figure 10:
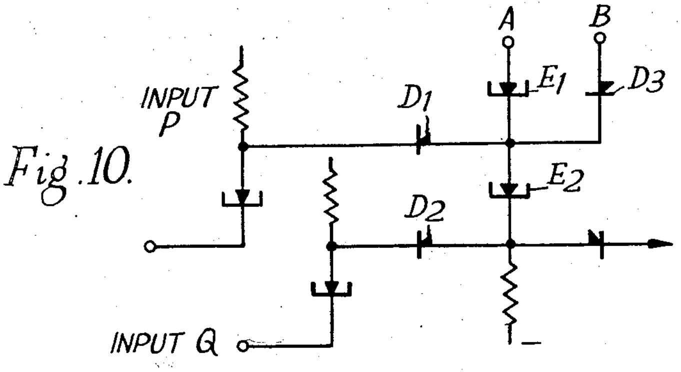

The circuit functions of the inhibit and invert are necessarily related and their circuits have similarities. FIGURE 10 illustrates an inhibit circuit. An input pulse applied between A and a low-voltage state at P will set $E_1$ to its high-voltage state, and thus inhibit or prevent a similar input at Q from setting $E_2$ into the high-voltage state. A positive pulse applied at B will then transfer the state of $E_2$ to set the next stage (not shown) to the opposite state, and will at the same time re-set $E_1$ to the low-voltage state. The circuit may be regarded as an inverter if P is regarded as the input, and if a negative pulse is always applied to Q before the information is transferred to the next stage.

Figure 11:
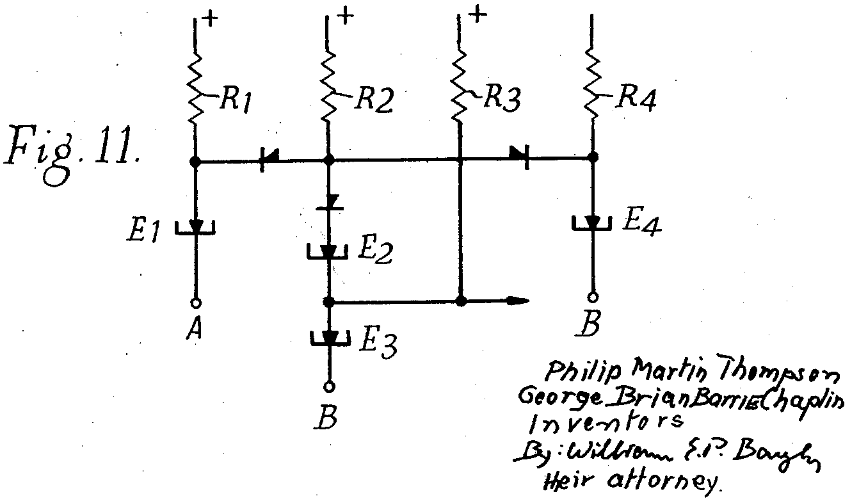

A circuit which performs the invert function in less time than the above circuit is shown in FIGURE 11, in which the two points marked B are kept at the same potential. Here $E_2$ is initially set into the high-voltage state and $E_4$ is permanently biased to the high-voltage state to provide a bias voltage for $E_2$, $E_3$, which operate as a Goto pair. Under these conditions if $E_1$ is in the low-voltage state, a transfer into the Goto pair $E_2$, $E_3$ will set $E_2$ into the low-voltage state whereafter, on the removal of the transfer pulse, $E_3$ is set into the high voltage state since the current $R_2$ is so chosen that $E_2$ and $E_3$ cannot both be in the low-voltage state, and since, due to the current in $R_3$, the current in $E_3$ will reach the low-voltage maximum when that in $E_2$ is still below the maximum value.

Figure 12:
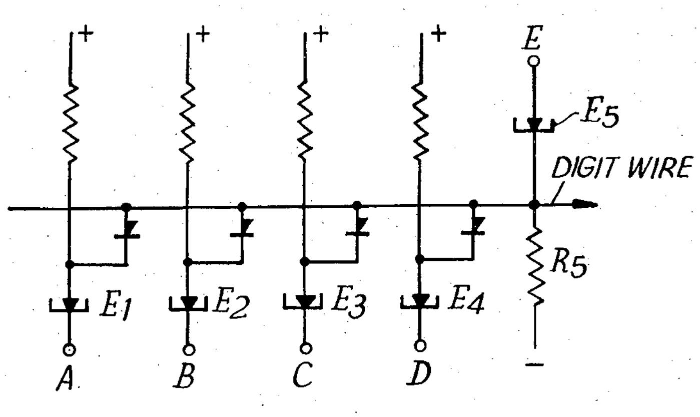
Figure 14:
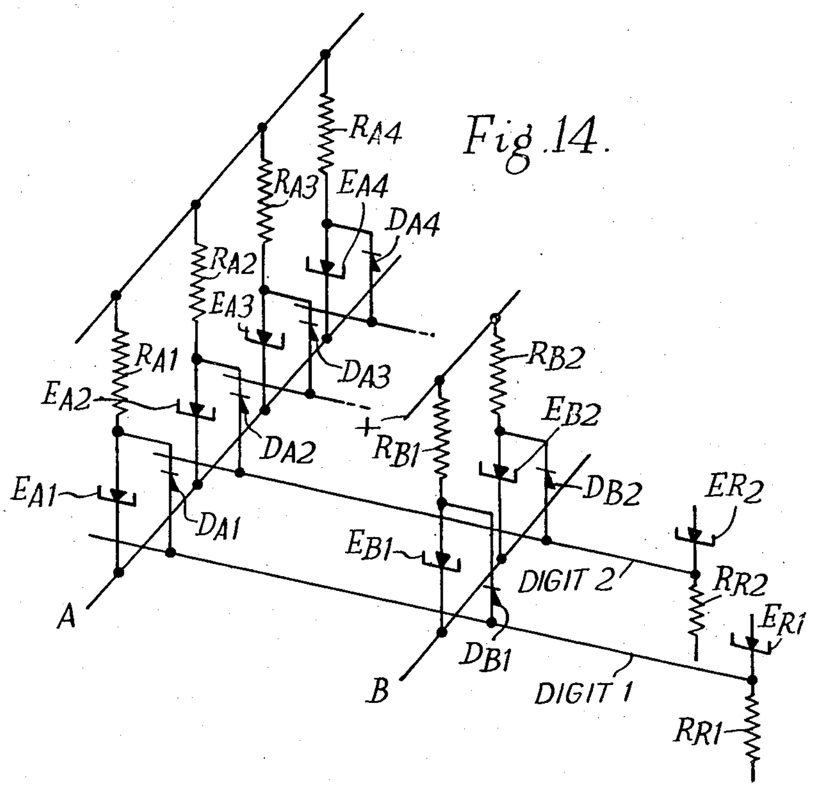

Basic elements of the type shown in FIGURE 1 may be used in a computer memory as shown in FIGURE 12, which is similar to the "or" circuit of FIGURE 8. The reverse state of any of a number of memory tunnel diodes $E_1$, $E_2$, $E_3$, $E_4$, can be transferred to a read-out tunnel diode $E_5$ by applying a negative pulse to the appropriate memory diode. A state may be transferred back by setting the reverse state in $E_5$, clearing the appropriate memory diode by temporarily removing the bias current and, after suitable re-adjustment of the bias currents, applying a negative pulse to the memory diode. FIGURE 12 represents a single bit in four words. In a computer memory all the bits in one word are driven from a single pulse source, and there is one read-out tunnel diode per bit. This is diagrammatically illustrated in the perspective view of FIGURE 14 of the accompanying drawing.

In this figure, in order not to complicate the drawing, only two pairs of word wires and two bit wires and fragments of some further bit wires are shown, the words being indicated by A, B and the digits by 1, 2 etc. Each "word" comprises a number of tunnel diodes respectively associated with the individual bits of the "word" and indicated by E with a letter index identifying the word and a figure index identifying the bit, and each tunnel diode has its anode connected to a positive word wire connected to a common positive terminal and indicated by + via a resistor R bearing the same indices as the diode, and has its cathode connected to a word wire bearing the letter identifying the word in question, while a point between the anode and resistor is connected by a rectifier diode, marked D with the indices of the word and bit, to the appropriate bit wire bearing the number of the bit in question, each bit wire being connected to a read-out tunnel diode marked E with the index R and a second index identifying the bit, said read-out diode being connected in series with a resistor indicated by R with the same indices and connecting the cathode of the tunnel diode with a negative terminal, the bit wire being connected to the junction between the cathode and the resistor.

Figure 13:
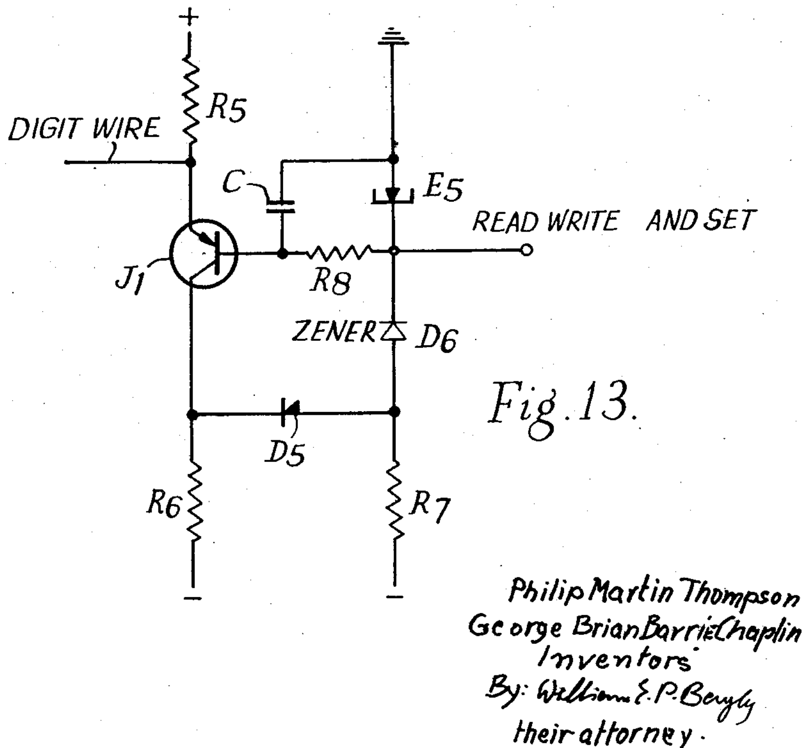

When there are a large number of words, the risk arises that the capacity loading of the diodes may prevent the read-out tunnel diode from being triggered, and also the risk that such capacity loading may add so greatly to the time required for setting the read-out diode that the latter may set a state back into a memory diode. These difficulties may be overcome by the circuit shown in FIGURE 13. A transistor $J_1$ acts as a common-base amplifier to the signal which sets the read-out tunnel diode $E_5$, and acts as an emitter follower to reduce the effect of the capacity loading on the tunnel diode $E_5$ when a new state is set into it. In the preferred circuit shown, a rectifier diode $D_5$ prevents spurious signals from re-setting the tunnel diode $E_5$ once the tunnel diode has been triggered. $D_6$ is a Zener diode which provides a collector voltage for transistor $J_1$; an RC network $R_8$, C delays the potential change of the base of transistor $J_1$ until the tunnel diode $E_5$ has been properly set.

What we claim is:

1. An electronic computer circuit comprising two tunnel diodes at least one of which is individually so biased by a current of such direction and magnitude as to allow the diode to be in either of two stable states corresponding to two voltages separated by an intermediate voltage at which the tunnel-diode current reaches a maximum, a rectifier diode which is non-conducting to current of one polarity and conducting to current of the opposite polarity when and only when the voltage across that diode exceeds a predetermined value, said rectifier diode being connected to directly so couple the two tunnel diodes as to permit, when conducting, a current to pass through the two tunnel diodes in series, and means for applying to the rectifier a voltage pulse of such direction and magnitude as will render it conducting to change the state of one of the tunnel diodes when and only when the other tunnel diode is in a predetermined one of its two stable states, said predetermined value being greater than the excess of the amplitude of said voltage pulse over the voltage difference between the two said states of the tunnel diode.

2. An electronic computer circuit as claimed in claim 1, wherein each of the tunnel diodes is individually so biased by a current of such direction and magnitude as to allow the diode to be in either of its two stable states, means being provided for arranging the bias current of one of the tunnel diodes to be nearer said current maximum so as to predetermine the direction of coupling.

3. An electronic computer circuit comprising two tunnel diodes connected in series with the interposition of a rectifier diode, each tunnel diode having, within a predetermined current range, two stable states, namely a high-voltage state and a low-voltage state for each current value, all three diodes being connected in the same (polar) direction, wherein each tunnel diode is biased by a current supplied at its connection to the rectifier diode and of such magnitude and direction as to permit the tunnel diode to be in either of two stable states corresponding to two voltages separated by a voltage at which the current through the tunnel diode reaches a maximum, the bias current in one of the tunnel diodes being nearer to the current maximum of the diode than is the bias current in the other tunnel diode, and a bias voltage of such magnitude and direction is applied to the three series-connected diodes that the rectifier diode is non-conductive whichever is the state of each of the tunnel diodes, means being provided for applying to the three series-connected diodes voltage pulses of the polarity which tends to render the rectifier diode conductive and of such magnitude as will render the rectifier diode conductive and force one of the tunnel diodes to its high-voltage state when and only when both tunnel-diodes are in their low-voltage states.

4. An electric computer circuit as claimed in claim 2, wherein at least three tunnel diodes each having a first and a second terminal and forming consecutive transfer stages, the first terminal of at least one of said tunnel diodes being connected by two rectifier diodes to the second terminal of each of two tunnel diodes each forming an adjacent transfer stage, means being provided for relatively varying the bias of alternate stages so as to determine the direction of progression.

5. A computer circuit as claimed in claim 2, wherein at least three tunnel diodes forming consecutive transfer stages, each said tunnel diode having a first and a second terminal and forming part of a biasing circuit, have alternate terminals interconnected in chain fashion by rectifier diodes whose polarity is such as to permit when conducting, current to flow through the two tunnel diodes coupled by each rectifier, the circuit comprising means for normally applying opposite voltage biases respectively to the thus interconnected terminals of alternate tunnel diodes of the chain so as to bias the rectifier diodes in their non-conducting direction, and means for applying voltage pulses to the other terminal of each tunnel diode of selected pairs adjacent in said chain in the direction of the flow of bias current and of such magnitude as to render the rectifier diode interconnecting the selected pair of tunnel diodes conducting.

6. A computer circuit as claimed in claim 5, including means varying during the duration of each said voltage pulse the bias voltages applied respectively to alternate tunnel diodes, to determine the desired direction of progression.

7. A computer circuit as claimed in claim 2, wherein a plurality of suitably biased tunnel diodes of a following stage are coupled through parallel rectifier diodes to a single tunnel diode of a first stage, means being provided to apply transfer pulses successively to the individual following-stage tunnel diodes to produce transfer from the first stage diode to all said following stage diodes.

8. A computer circuit as claimed in claim 2, wherein one pole of each of a plurality of first-stage tunnel diodes each having, within a predetermined current range, a stable high-voltage state and a stable low-voltage state for each current value, is coupled through a separate rectifier diode to the opposite pole of a single second-stage tunnel diode, to place the second-stage diode into its high-voltage state if a transfer pulse is applied when at least one of the first-stage diodes is in its low-voltage state.

9. A computer circuit as claimed in claim 8, wherein, to provide a computer memory, the first-stage tunnel diodes form bits of a word by being each connected in parallel between a common pair of word terminals with other similar tunnel diodes forming other bits of the same word, a separate resistor being interposed between one of the word terminals and the junction of each bit tunnel diode with its coupling rectifier diode, each second-stage tunnel diode being connected by a bit wire to the other terminal of the coupling rectifier of the corresponding bit in each of a number of words.

10. A computer circuit as claimed in claim 9, including means permitting reversal of the respective magnitude relations of the bias currents of the first-stage and second-stage tunnel diodes according as memory-writing and memory-reading operations are required.

11. A computer circuit as claimed in claim 2, including a plurality of first-stage tunnel diodes each having two poles and each having, within a predetermined current range, a stable high-voltage state and a stable low-voltage state for each current value, each of said first-stage tunnel diodes being connected through a separate rectifier diode to the same pole of a following-stage tunnel diode so as to transfer to the latter a high-voltage state of any of the first-stage tunnel diodes.

References Cited in the file of this patent

Application Lab. Report 681, Philco Corporation, Lansdale Division, December 1960.

IBM Technical Disclosure Bulletin, vol. 3, No. 7, December 1960, Tunnel Diode Memory Package, page 29.

The Tunnel Diode Circuit Design Handbook, March 1961, Transitron Electronic Corporation, Wakefield, Mass.